United States Patent
Imura et al.

(10) Patent No.: US 8,900,774 B2
(45) Date of Patent: Dec. 2, 2014

(54) FUEL CELL LAYER, FUEL CELL SYSTEM AND METHOD FOR FABRICATING THE FUEL CELL LAYER

(75) Inventors: Shinichiro Imura, Osaki (JP); Jeremy Schrooten, Mission (CA); Gerard F. McLean, West Vancouver (CA); Jean-Louis Iaconis, Burnaby (CA); Martin Lagroix, British Columbia (CA)

(73) Assignees: Sanyo Electric Co., Ltd., Osaka (JP); Societe BIC, Clichy (FR)

( * ) Notice: Subject to any disclaimer, the term of this patent is extended or adjusted under 35 U.S.C. 154(b) by 695 days.

(21) Appl. No.: 12/731,686

(22) Filed: Mar. 25, 2010

(65) Prior Publication Data

US 2011/0236785 A1    Sep. 29, 2011

(51) Int. Cl.
H01M 8/02 (2006.01)
H01M 8/24 (2006.01)
H01M 2/08 (2006.01)
H01M 8/10 (2006.01)
H01M 4/88 (2006.01)

(52) U.S. Cl.
CPC ............ *H01M 8/0247* (2013.01); *H01M 4/881* (2013.01); *H01M 8/242* (2013.01); *H01M 4/8814* (2013.01); *H01M 8/1004* (2013.01); *H01M 8/0286* (2013.01); *Y02E 60/521* (2013.01); *H01M 4/8835* (2013.01); *H01M 4/8892* (2013.01); *H01M 2008/1095* (2013.01); *H01M 4/886* (2013.01); *H01M 8/2405* (2013.01); *Y02E 60/50* (2013.01); *H01M 8/0243* (2013.01); *H01M 8/0271* (2013.01); *H01M 8/023* (2013.01); *H01M 8/2465* (2013.01)
USPC ............................ 429/508; 429/469; 429/507

(58) Field of Classification Search
USPC .......... 429/453, 460, 468–470, 520, 507–510
See application file for complete search history.

(56) References Cited

U.S. PATENT DOCUMENTS

| 5,509,942 A | 4/1996 | Dodge |
| 5,861,221 A | 1/1999 | Ledjeff et al. |

(Continued)

FOREIGN PATENT DOCUMENTS

| EP | 0507977 A1 | 10/1992 |
| JP | 541221 A | 2/1993 |

(Continued)

OTHER PUBLICATIONS

"International Application Serial No. PCT/JP2011/001640, International Search Report mailed Nov. 23, 2011", 6 pgs.

(Continued)

*Primary Examiner* — Muhammad Siddiquee
(74) *Attorney, Agent, or Firm* — Schwegman Lundberg & Woessner, P.A.

(57) ABSTRACT

A fuel cell layer includes a plurality of membrane electrode assemblies disposed in a planar array arrangement and an interconnector for electrically coupling an anode catalyst layer of one of adjacent membrane electrode assemblies to a cathode catalyst layer of the other of the adjacent membrane electrode assemblies. Each membrane electrode assembly includes an electrolyte membrane, the anode catalyst layer provided on one face of the electrolyte member and the cathode catalyst layer provided on the other face of the electrolyte membrane in such a manner that at least part of which is disposed counter to the anode catalyst layer. The interconnector is formed of at least one of a material constituting the anode catalyst layer and a material constituting the cathode catalyst layer.

12 Claims, 10 Drawing Sheets

(56) References Cited

U.S. PATENT DOCUMENTS

| | | | |
|---|---|---|---|
| 5,871,624 | A | 2/1999 | Crome |
| 6,127,058 | A | 10/2000 | Pratt et al. |
| 7,531,260 | B2 * | 5/2009 | Day et al. ............... 429/433 |
| 2001/0044041 | A1 | 11/2001 | Badding et al. |
| 2005/0089738 | A1 * | 4/2005 | Tao et al. ............. 429/27 |
| 2006/0194088 | A1 | 8/2006 | Kabumoto |
| 2007/0134531 | A1 | 6/2007 | Kimura et al. |
| 2007/0202372 | A1 | 8/2007 | Kaburnoto |
| 2008/0176125 | A1 | 7/2008 | Kanda et al. |
| 2008/0261088 | A1 | 10/2008 | Cha et al. |
| 2009/0123810 | A1 | 5/2009 | Devoe et al. |
| 2009/0162722 | A1 | 6/2009 | Schrooten et al. |
| 2011/0003229 | A1 * | 1/2011 | Schrooten et al. ........... 429/457 |

FOREIGN PATENT DOCUMENTS

| | | | |
|---|---|---|---|
| JP | 06-065045 | A | 8/1994 |
| JP | 665045 | B2 | 8/1994 |
| JP | 9501007 | A | 1/1997 |
| JP | 10510390 | A | 10/1998 |
| JP | 2001-273914 | A | 10/2001 |
| JP | 2001273914 | A | 10/2001 |
| JP | 200256855 | A | 2/2002 |
| JP | 2004146092 | A | 5/2004 |
| JP | 2004514240 | A | 5/2004 |
| JP | 2005-093274 | A | 4/2005 |
| JP | 200593274 | A | 4/2005 |
| JP | 2005520306 | A | 7/2005 |
| JP | 200847453 | A | 2/2008 |
| JP | 2008210714 | A | 9/2008 |
| JP | 2009140646 | A | 6/2009 |
| JP | 2010257943 | A | 11/2010 |
| JP | 2011515794 | A | 5/2011 |
| WO | WO-03081693 | A2 | 10/2003 |
| WO | WO-2005/045970 | A1 | 5/2005 |
| WO | WO-2009/105896 | A1 | 9/2009 |

OTHER PUBLICATIONS

"International Application Serial No. PCT/JP2011/001640, International Preliminary Report on Patentability mailed Sep. 25, 2012", 10 pgs.

"Japanese Application Serial No. 2010-073104, Office Action mailed Feb. 25, 2014", w/English translation, 15 pgs.

"Chinese Application Serial No. 201180015977.5, Search Report mailed Jul. 13, 2014", English translation, 1 pg.

"Japanese Application Serial No. 2010-073104, Office Action mailed Jul. 15, 2014", 1 pg.

* cited by examiner

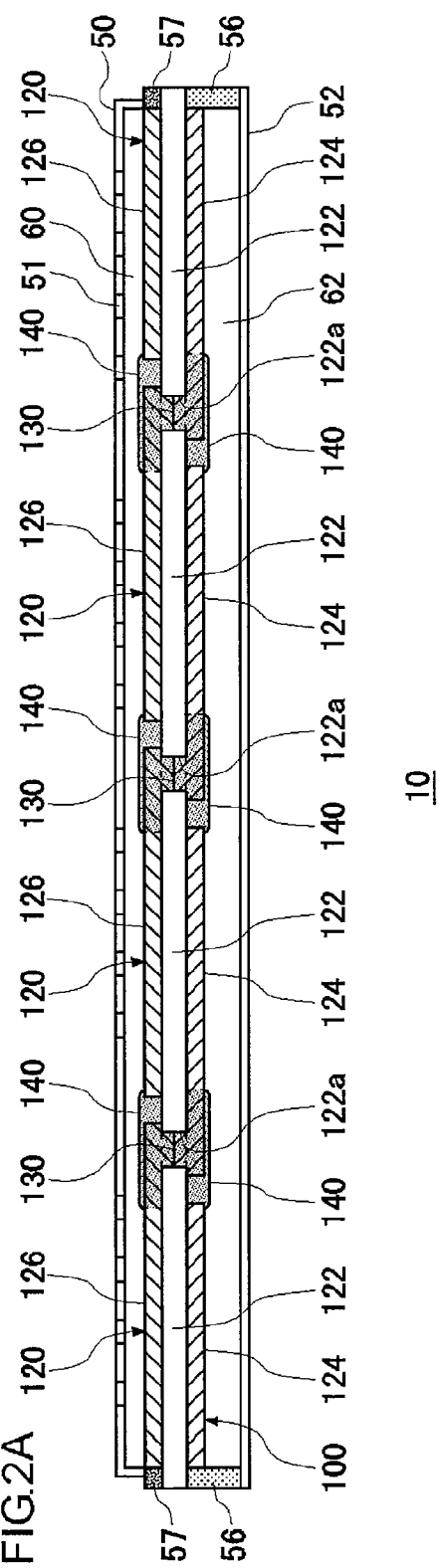
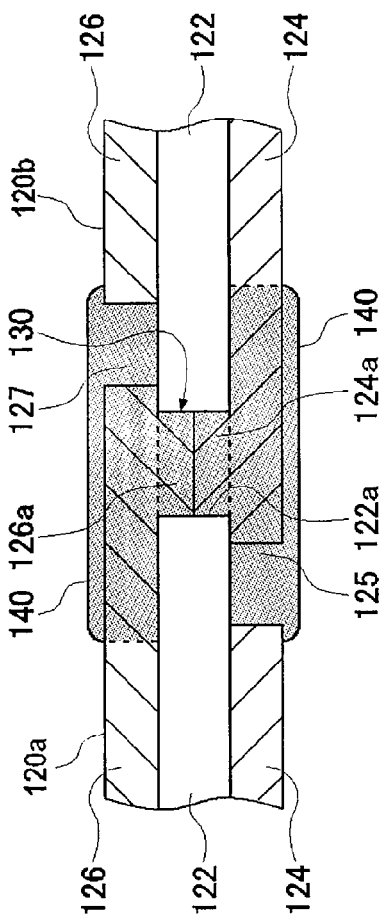
FIG.2A
FIG.2B

FUEL CELL LAYER, FUEL CELL SYSTEM AND METHOD FOR FABRICATING THE FUEL CELL LAYER

BACKGROUND OF THE INVENTION

1. Field of the Invention

The present invention relates to a fuel cell layer, a fuel cell system and a fabrication method for the fuel cell layer. More particularly, the invention relates to a fuel cell layer with membrane electrode assemblies disposed in a planar arrangement, a fuel cell system including the fuel cell layer, and a method for fabricating the fuel cell layer.

2. Description of the Related Art

A fuel cell is a device that generates electricity from hydrogen and oxygen so as to obtain highly efficient power generation. A principal feature of a fuel cell is its capacity for direct power generation which does not undergo a stage of thermal energy or kinetic energy as in conventional power generation. This presents such advantages as high power generation efficiency despite the small scale setup, reduced emission of nitrogen compounds and the like, and environmental friendliness on account of minimal noise or vibration. A fuel cell is capable of efficiently utilizing chemical energy in its fuel and, as such, environmentally friendly. Fuel cells are therefore envisaged as an energy supply system for the twenty-first century and have gained attention as a promising power generation system that can be used in a variety of applications including space applications, automobiles, mobile devices, and large and small scale power generation. Serious technical efforts are being made to develop practical fuel cells.

In particular, polymer electrolyte fuel cells feature lower operating temperature and higher output density than the other types of fuel cells. In recent years, therefore, the polymer electrolyte fuel cells have been emerging as a promising power source for mobile devices such as cell phones, notebook-size personal computers, PDAs, MP3 players, digital cameras, electronic dictionaries or electronic books. Well known as the polymer electrolyte fuel cells for mobile devices are planar fuel cell layers, where a plurality of membrane electrode assemblies (single cells) are arranged in a plane.

SUMMARY OF THE INVENTION

The present invention has been made in view of the foregoing problems, and a purpose thereof is to provide a technology enabling to reduce the number of materials required for the fabrication of planar fuel cells.

One embodiment of the present invention relates to a fuel cell layer. The fuel cell layer comprises: a plurality of membrane electrode assemblies, disposed in a planar arrangement, each membrane electrode assembly including an electrolyte membrane, an anode catalyst layer provided on one face of the electrolyte member and a cathode catalyst layer provided on the other face of the electrolyte membrane in such a manner that at least part of which is disposed counter to the anode catalyst layer; and an interconnector which electrically connects the anode catalyst layer of one of the adjacent membrane electrode assemblies to the cathode catalyst layer of the other of the adjacent membrane electrode assemblies, wherein the interconnector is formed of at least one of a material that constitutes the anode catalyst layer and a material that constitutes the cathode catalyst layer.

In the above-described embodiment, the interconnector may be integrally formed with the anode catalyst layer made of the same material with the interconnector; or may be integrally formed with the cathode catalyst layer made of the same material with the interconnector; or the interconnector may comprise a part integrally formed with the anode catalyst layer and a part integrally formed with the cathode catalyst layer.

Another embodiment of the present invention relates to a fuel cell system, including a fuel cell layer, anode housing and cathode housing. The fuel cell system may further include gaskets or sealing layers disposed between the fuel cell layer and the anode and cathode housings. The cathode housing may include air inlets.

Still another embodiment of the present invention relates to a method for fabricating a fuel cell layer. The fabrication method includes: forming a plurality of membrane electrode assemblies disposed in a planar arrangement in such a manner that forming a plurality of anode catalyst layers on one face of an electrolyte membrane and forming a plurality of cathode catalyst layers on the other face of the electrolyte membrane are carried out simultaneously or in random order; and forming an interconnector configured to electrically connect the anode catalyst layer in one of adjacent membrane electrode assemblies and the cathode catalyst layer in the other of adjacent membrane electrode assemblies to each other in such a manner that a material for use as the anode catalyst layer is filled into a spacing, used to separate the electrolyte membrane of the adjacent membrane electrode assemblies partially or completely, by forming the anode catalyst layer or a material for use as the catalyst layer is filled into the spacing by forming the cathode catalyst layer, or forming the interconnector in such a manner that the material for use as the anode catalyst layer is filled into the spacing by forming the anode catalyst layer and the material for use as the catalyst layer is filled into the spacing by forming the cathode catalyst layer.

It is to be noted that any arbitrary combinations or rearrangement of the aforementioned structural components and so forth are all effective as and encompassed by the embodiments of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 2A is a cross-sectional view of a fuel cell layer taken along the line A-A of FIG. 1;

FIG. 2B is a partially enlarged cross-sectional view schematically showing a vicinity of an interconnector shown in FIG. 2A;

DETAILED DESCRIPTION OF THE INVENTION

Figure 1:
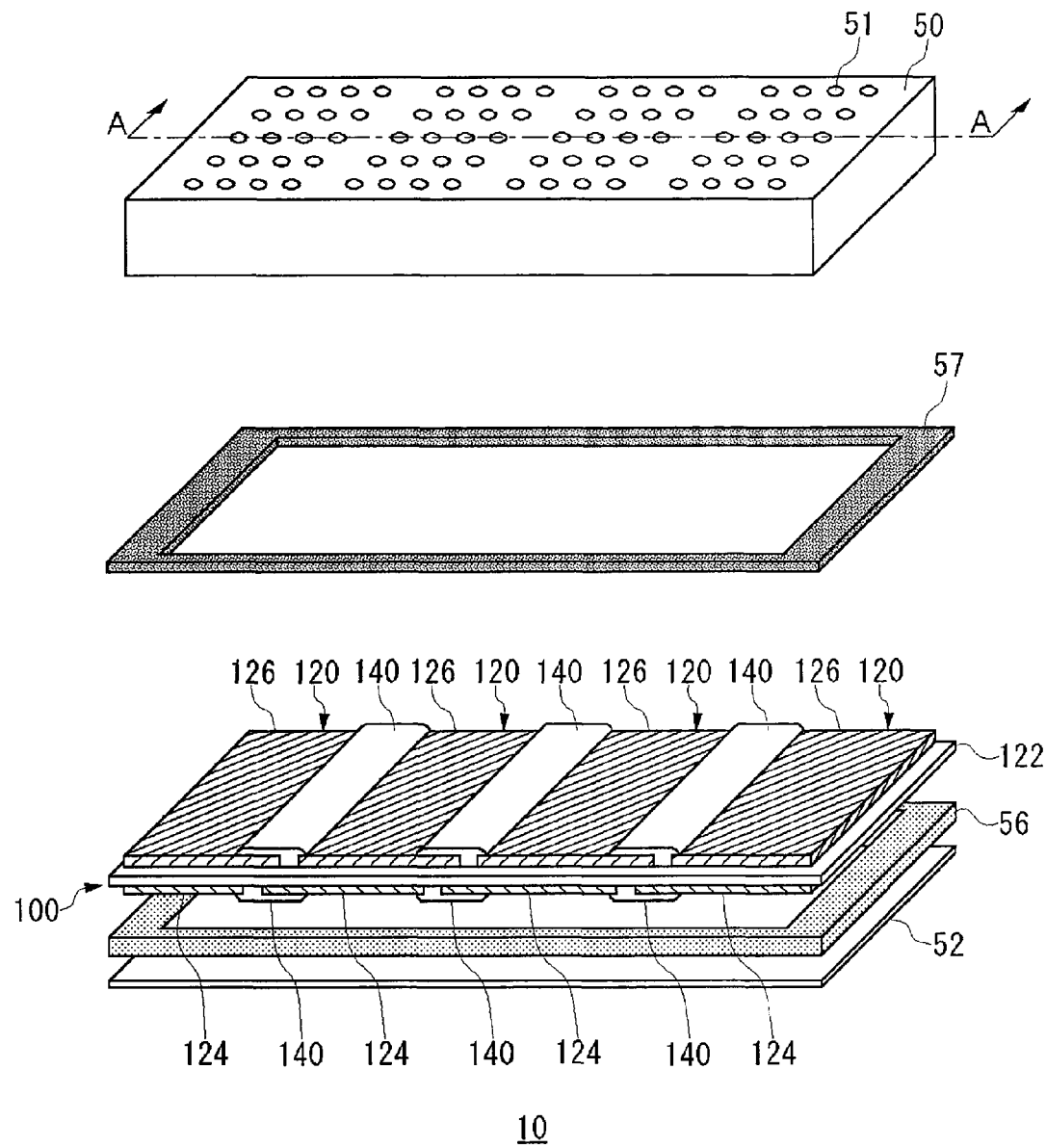
FIG. 1 is an exploded perspective view schematically showing a structure of a fuel cell layer according to a first embodiment of the present invention.

The embodiments will now be described with reference to drawings. Note that in all of the Figures the same or similar components, parts and processings are given the same reference numerals and the repeated description thereof is omitted as appropriate. Moreover, the embodiments given herein are for illustrative purposes only and all features and their combination thereof described in the present embodiment are not necessarily essential to the invention.

(First Embodiment)

FIG. 1 is an exploded perspective view schematically showing a structure of a fuel cell layer according to a first embodiment of the present invention. FIG. 2A is a cross-sectional view of the fuel cell layer taken along the line A-A of FIG. 1. FIG. 2B is a partially enlarged cross-sectional view showing a vicinity of an interconnector shown in FIG. 2A. Referring to FIG. 1, a fuel cell system 10 includes a fuel cell layer 100, a cathode housing 50 and an anode housing 52. The fuel cell layer 100 at cross-section A-A of FIG. 1 is illustrated in FIG. 2A.

A fuel cell layer 100 includes a plurality of membrane electrode assemblies (MEAs) 120 disposed in a planar arrangement, and interconnectors 130 (not shown in FIG. 1). Each membrane electrode assembly 120 includes an electrolyte membrane 122, an anode catalyst layer 124 provided on one face of the electrolyte member 122 and a cathode catalyst layer 126 provided on the other face of the electrolyte membrane 122 in such a manner that at least part of which is disposed counter to the anode catalyst layer 124.

The electrolyte membrane 122, which may show excellent ion conductivity in a moist condition, functions as an ion-exchange membrane for the transfer of protons between the cathode catalyst layer 124 and the anode catalyst layer 126. The electrolyte membrane 122 may be formed of a solid polymer material such as a fluorine-containing polymer or a nonfluorine polymer. The material that can be used for the electrolyte membrane 122 may be, for instance, a sulfonic acid type perfluorocarbon polymer, a polysulfone resin, a perfluorocarbon polymer having a phosphonic acid group or a carboxylic acid group, or the like. An example of the sulfonic acid type perfluorocarbon polymer is Nafion membrane (made by DuPont: registered trademark). Also, an example of the nonfluorine polymer is a sulfonated aromatic polyether ether ketone, polysulfone or the like. The thickness of the electrolyte membrane 122 may be about 10 to 200 μm, for instance.

A plurality of anode catalyst layers 124 in each membrane electrode assembly 120 may be disposed on one face of the electrolyte membrane 122 in such a manner as to be slightly apart from each other (as illustrated by spacing 125). A plurality of cathode catalyst layers 126 in each membrane electrode assembly 120 may be disposed on the other face of the electrolyte membrane 122 in such a manner as to be slightly apart from each other (as illustrated by spacing 127). A membrane electrode assembly 120 (single cell) is structured by a pair of anode catalyst layer 124 and cathode catalyst layer 126 with the electrolyte membrane 122 held between the anode catalyst layer 124 and the cathode catalyst layer 126. The anode catalyst layers 124 and cathode catalyst layers 126 may be arranged in a variety of configurations, provided that a region of electrical discontinuity is maintained between adjacent single cells to prevent electrical shorting of the fuel cell layer 100. Examples of such configurations may be found in U.S. Patent Application Publication No. 2009/0162722, entitled "Electrochemical cell assemblies including a region of discontinuity", the disclosure of which is herein incorporated by reference in its entirety. Hydrogen may be supplied to the anode catalyst layers 124 as fuel gas. Although the embodiments described contemplate using hydrogen gas as fuel, it is to be understood that any other suitable fuels may be used, such as methanol, formic acid, butane, or other hydrogen carriers, for example. Air may be supplied to the cathode catalyst layers 126 as oxidant. Each single cell or membrane electrode assembly 120 generates electric power through an electrochemical reaction between the fuel (e.g. hydrogen) and oxygen in the air.

The anode catalyst layer 124 and the cathode catalyst layer 126 may each be provided with ion-exchange material and catalyst particles or carbon particles as the case may be. The ion-exchange material contained in the anode catalyst layer 124 and the cathode catalyst layer 126 may be used to promote adhesion between the catalyst particles and the electrolyte membrane 122. This ion-exchange material may also play a role of transferring protons between the catalyst particles and the electrolyte membrane 122. The ion-exchange material may be formed of a polymer material similar to that of the electrolyte membrane 122. A catalyst metal may be a single element or an alloy of two or more elements selected from among Sc, Y, Ti, Zr, V Nb, Fe, Co, Ni, Ru, Rh, Pd, Pt, Os, Ir, lanthanide series element, and actinide series element. Furnace black, acetylene black, ketjen black, carbon nanotube or the like may be used as the carbon particle when a catalyst is to be supported. The thickness of the anode catalyst layer 124 and the cathode catalyst layer 126 may be from about 10 to about 40 μm, for instance.

As described above, the fuel cell layer 100 according to the first embodiment comprises a plurality of membrane electrode assemblies 120, formed in a planar arrangement, which are composed of the respective pairs of anode catalyst layers 124 and cathode catalyst layers 126 with the electrolyte membrane 122 interposed between the anode catalyst layer 124 and the cathode catalyst layer 126.

As shown in FIGS. 2A and 2B, the interconnector 130 is a member used to electrically connect adjacent single cells or membrane electrode assemblies 120 by providing an electrical pathway from the anode catalyst layer 124 of one membrane electrode assembly 120 to the cathode catalyst layer 126 of an adjacent membrane electrode assembly 120. An aperture is provided between the adjacent membrane electrode assemblies 120, and is used to separate the electrolyte membrane 122 of the adjacent membrane electrode assemblies 120 partially or completely. The interconnector 130 is so provided as to penetrate the electrolyte membrane 122 in the aperture. The electrolyte membrane 122 of fuel cell layer 100 according to the present embodiment has discrete through-holes 122a (See also FIG. 4) as apertures, and the interconnector 130 is provided in the through-hole 122a. Note that the aperture may be achieved by not only the through-hole 122a, which is used to partially separate the electrolyte membrane 122 of the adjacent membrane electrode assemblies 120, but also by a slit which may be used to completely separate the adjacent membrane electrode assemblies 120 and by extending along the width direction of the membrane electrode assemblies 120. If the aperture is achieved by a through-hole 122a, the strength of fuel cell layer 100 may be more enhanced than in the case where the aperture is achieved by a slit. Also, the amount of materials required for the formation of the interconnector 130 may be reduced.

The adjacent membrane electrode assemblies 120 may be connected together in series by the interconnector 130. In the present embodiment, an end of the anode catalyst layer 124 of one of two adjacent membrane electrode assemblies 120 extends to the interconnector 130, and the end thereof is electrically connected to one end of the interconnector 130. Also, an end of the cathode catalyst layer 126 of the other thereof extends to the interconnector 130, and the end thereof is electrically connected to the other end of the interconnector 130. The width of the interconnector 130 may be about 30 to 300 μm, for instance.

The interconnector 130 is formed of at least one of a material that constitutes the anode catalyst layer 124 and a material that constitutes the cathode catalyst layer 126. As a result, the number of materials required for the fabrication of the fuel cell layer 100 may be reduced as compared with the case where separate members such as terminal tabs need to be prepared as the interconnectors in the conventional planar fuel cells.

Also, the interconnector 130 may be integrally formed with the anode catalyst layer 124 made of the same material with the interconnector or the cathode catalyst layer 126 made of the same material with the interconnector 130. Or the interconnector 130 may comprise a part integrally formed with the anode catalyst layer 124 and a part integrally formed with the cathode catalyst layer 126. As a result, the number of components used can be reduced as compared with the conventional practice. Also, the contact resistance between the interconnector 130 and each catalyst layer can be reduced as compared with that in the conventional fuel cells.

In the present embodiment illustrated in FIG. 2B, the interconnector 130 comprises the material that constitutes the anode catalyst layer 124 and the material that constitute the cathode catalyst layer 126, and is constructed by a part integrally formed with the anode catalyst layer 124 and a part integrally formed with the cathode catalyst layer 126. More specifically, a protrusion 124a protruding into a through-hole 122a is formed in the surface of the anode catalyst layer 124 and a protrusion 126a protruding into a through-hole 122a is formed in the surface of the cathode catalyst layer 126. An edge of the protrusion 124a and an edge of the protrusion 126a are coupled together in the through-hole 122, thereby forming an interconnector 130. The height of the protrusion 124a and the protrusion 126a may be, for example, about a half of the width of the electrolyte membrane 122, and the interface between the protrusion 124a and the protrusion 126a may be located approximately at the middle of the electrolyte membrane 122 in the width direction.

In other embodiments, the interconnector 130 may be formed by protrusion 124a formed in the surface of the anode catalyst layer 124 or by protrusion 126a formed in the surface of cathode catalyst layer 126. In such embodiments, the edge of the protrusion 124a or 126a may extend through the entire width of the electrolyte membrane, and may be coupled together with surface of the cathode catalyst layer 126 or with the surface of the anode catalyst layer 124, respectively, to form interconnector 130.

Also, according to the present embodiment illustrated in FIG. 2B, the anode catalyst layer 124 of membrane electrode assembly 120b and the cathode catalyst layer 126 of membrane electrode assembly 120a, disposed adjacent to the membrane electrode assembly 120b, may overlap partially with each other as viewed planarly. In such embodiments, the interconnector 130 is provided in a region where the anode catalyst layer 124 of membrane electrode assembly 120b and the cathode catalyst layer 126 of membrane electrode assembly 120a overlap with each other. By employing such a structure as described above, the through-hole 122a can be extended perpendicular to the anode catalyst layer 124 and the cathode catalyst layer 126, so that the length of the through-hole 122a can be made shortest. As a result, the length of the interconnector 130 can be made shortest and therefore the increase of a resistance in the interconnector 130 can be suppressed and the amount of catalyst materials required for the formation of the interconnector 130 can be reduced. Furthermore, the area of an extending region, of the interconnector 130, which is occupied in the fuel cell layer 100 can be made smaller. Accordingly, if the size of the fuel cell layer 100 in the fuel cell system 10 according to the present embodiment is to be made equal to that used in a conventional fuel cell, the production of electricity in the fuel cell system 10 according to the present embodiment can be raised by increasing the area of power generation region. Conversely, if the electricity generated by the fuel cell system 10 according to the present embodiment is to be made equal to conventional fuel cell system, the planar fuel cell system 10 according to the present embodiment can be made compact and smaller in size. For example, the area ratio of power generation region (which is a region between two seal layers 140) and non-power-generation region (which is a region covered by the seal layer 140) may be between about 7.5:1 to about 5:1.

The interconnector 130, which is formed of at least one of a material constituting the anode catalyst layer 124 and a material constituting the cathode catalyst layer 126, has a plurality of fine pores. As a result, there is a possibility that a so-called cross leak may occur, in which hydrogen, serving as a fuel supplied to the anode catalyst layer 124, travels to a cathode catalyst layer 126 side by way of the interconnector 130 and also air, serving as an oxidant supplied to the cathode catalyst layer 126, travels to an anode catalyst layer 124 side by way of the interconnector 130. Thus, seal layers 140 used to block the traveling of fuel and oxidant to the other catalyst sides via the interconnector 130 are provided in the vicinity of the interconnector 130.

The seal layer 140 may be formed of a material, such as a resin, which can block the flow of gas. If the seal layer 140 contacts like catalyst layers of adjacent membrane electrode assemblies 120, the seal layer 140 must be electrically non-conductive to prevent shorting of the fuel cell layer 100. Examples of a material constituting the seal layer 140 may include a fluorinated resin, such as Nafion (registered trademark) used also for the electrolyte membrane 122 or Teflon (registered trademark), and so forth. The seal layers 140 may be formed as follows: a solution that contains the material constituting the seal layer 140 may be applied to the surfaces of the anode catalyst layer 124 and the cathode catalyst layer 126 in the vicinity of the interconnector 130 including the top thereof. The resin solution is infiltrated into the interconnector 130 and the anode catalyst layer 124 and the cathode catalyst layer 126 disposed in the vicinity of the interconnector 130, thereby forming the seal layers 140. The infiltration of the resin solution fills the fine pores of a material constituting the interconnector 130, the fine pores of the anode catalyst layer 124 in the vicinity of the interconnector 130 and the fine pores of the cathode catalyst layer 126 in the vicinity of the interconnector 130, with the seal material. By employing the method and the structure as described above, the cross leak occurring via the interconnector 130 can be prevented.

In addition, the seal layers 140 may be so provided as to fill in a spacing 125 between the adjacent anode catalyst layers 124 and a spacing 127 between the adjacent cathode catalyst layers 126. Filling the spacing 125 and the spacing 127 by the seal layers 140 may prevent water generated from the electrochemical reaction from collecting in the spacings 125 and 127.

Accordingly, if the size of the fuel cell layer 100 in the fuel cell system 10 according to the present embodiment is to be made equal to that used in a conventional fuel cell, the production of electricity in the fuel cell system 10 according to the present embodiment can be raised by increasing the area of power generation region. If the electricity generated by the fuel cell system 10 according to the present embodiment is to be made equal to conventional fuel cells, the planar fuel cell layer 100 according to the present embodiment can be made compact and smaller in size.

Note that the seal layer 140 provided on the anode catalyst layer 124 side extends to a region disposed opposite to the spacing 127 of the cathode catalyst layer 126. Note also that the seal layer 140 provided on the cathode catalyst layer 126 side extends to a region disposed opposite to the spacing 125 of the anode catalyst layer 124. A region interposed by the spacing 125 and the spacing 127 as viewed planarly may not contribute to the power generation. Thus, the formation of the seal layers 140 in this region interposed thereby can prevent the cross leaks and the shorts between the adjacent electrodes without causing a drop in the electricity generated by each membrane electrode assembly 120.

As shown in FIG. 1 and FIG. 2A, the cathode housing 50 may be a plate-like member disposed counter to the cathode catalyst layer 126. The cathode housing 50 may be provided with air inlets 51 for feeding air from outside. An air chamber 60 where the air flows may be formed between the cathode housing 50 and the cathode catalyst layer 126.

The anode housing 52 may be a plate-like member disposed counter to the anode catalyst layer 124. A fuel gas chamber 62 for storing the fuel may be formed between the anode housing 52 and the anode catalyst layer 124. A fuel supply port (not shown) may be formed in the anode housing 52, so that the fuel can be supplied as needed from a fuel cartridge or the like.

The material used for the cathode housing 50 and the anode housing 52 may be a commonly-used plastic resin such as phenol resin, vinyl resin, polyethylene resin, polypropylene resin, polystyrene resin, urea resin or fluororesin.

A gasket 56 may be provided between the outer periphery of the electrolyte membrane 122 and the anode housing 52. Provision of the gaskets 56 may enhance the sealing performance of the fuel gas chamber 62 and prevent leakage of the fuel. Also, a gasket 57 may be provided between the outer periphery of the electrolyte membrane 122 and the cathode housing 50.

(Manufacturing Process of Fuel Cell Layer)

Figure 3A:
FIGS. 3A to 3C are cross-sectional views showing a process in a method for manufacturing a fuel cell layer according to a first embodiment of the present invention.
Figure 3B:
Figure 3C:
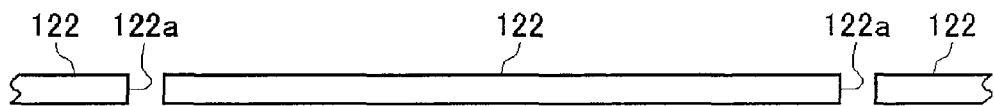
Figure 4:
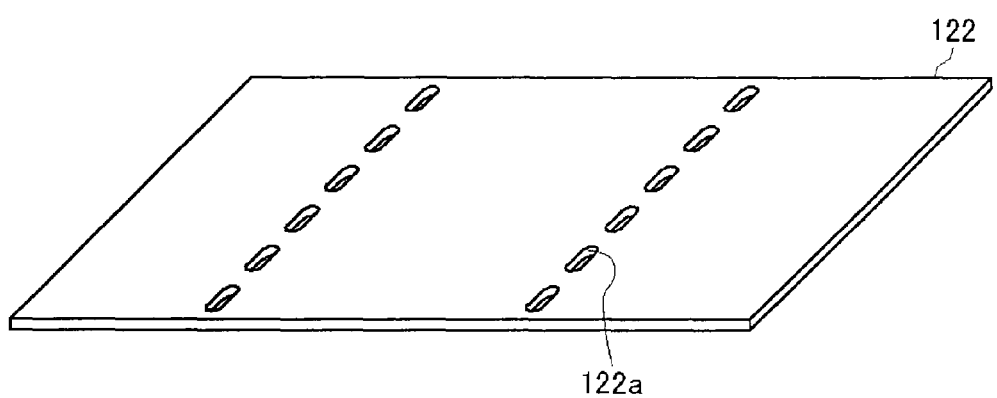
FIG. 4 is a schematic perspective view of an electrolyte membrane.

A description is now given of a method for manufacturing a fuel cell layer according to a first embodiment with reference to FIGS. 3A to 3C, FIG. 4, FIGS. 5A to 5D and FIGS. 6A to 6D. FIGS. 3A to 3C, FIGS. 5A to 5D and FIGS. 6A to 6D are process diagrams showing a manufacturing method of a fuel cell layer according to the first embodiment. FIG. 4 is a schematic perspective view of an electrolyte membrane.

As shown in FIG. 3A, an electrolyte membrane 122 may be prepared.

Then, as shown in FIG. 33, the electrolyte membrane 122, may be patterned so as to form apertures in predetermined positions. For example, the electrolyte membrane 122 may be irradiated with a laser light L, thereby selectively removing portions of the electrolyte membrane 122. This process may result in the formation of through-holes 122a or slits (not shown) in predetermined positions, as shown in FIG. 3C and FIG. 4. In other embodiments, through-holes 122a may be formed by mechanical punching, die cutting or direct molding instead of the laser irradiation. Also, the number of through-holes 122a, the size thereof and the like may be set as appropriate in accordance with the strength of the electrolyte membrane 122 and the resistance of the interconnector 130 that connects the adjacent membrane electrode assemblies 120.

Figure 5A:
FIGS. 5A to 5D are cross-sectional views showing a process in a method for manufacturing a fuel cell layer according to a first embodiment of the present invention.
Figure 5B:
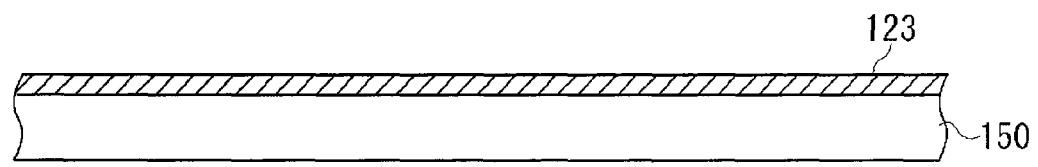

In addition to the formation of the through-holes 122a in the electrolyte membrane 122 as shown in FIGS. 3A to 3C, a material 123a for anode catalyst layer may applied to the surface of a first substrate 150 using a spray coating method, for instance, as shown in FIG. 5A. As a result, a layer of material 123 for anode catalyst layer may be formed on the whole surface of the first substrate 150. In some embodiments, first substrate 150 may be subjected to the fluorine processing treatment at least on the surface thereof.

Figure 5C:
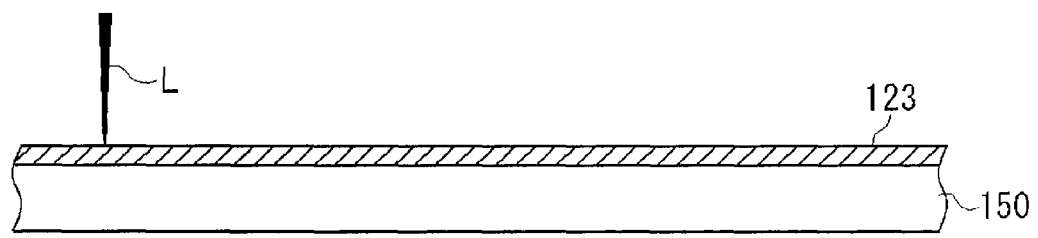
Figure 5D:
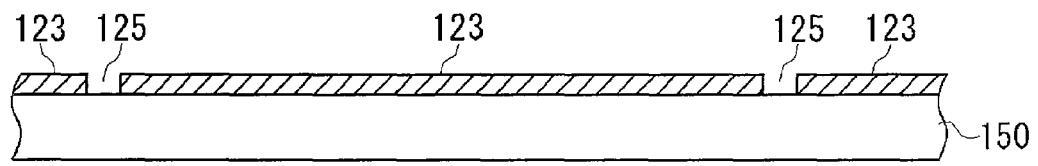

Then, as shown in FIG. 5C, the layer of material 123 for anode catalyst layer may be irradiated with the laser light L, for instance, in predetermined positions, thereby removing selectively the layer of material 123 for anode catalyst layer. This process results in the formation of a plurality of layers of material 123 for anode catalyst layer demarcated by the spacings 125 on the surface of the first substrate 150. Note that other conventional methods such as a screen printing method may be used in the formation of the layers of material 123 for anode catalyst layer on the surface of the first substrate 150.

Figure 6A:
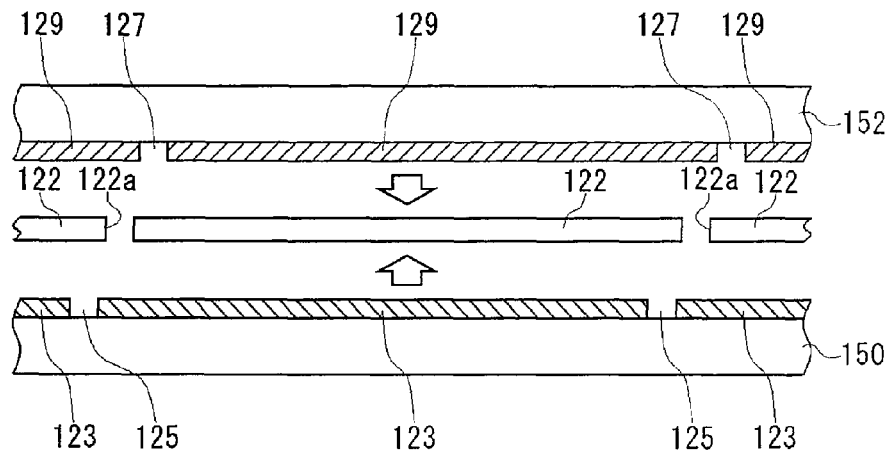
FIGS. 6A to 6D are cross-sectional views showing a process in a method for manufacturing a fuel cell layer according to a first embodiment of the present invention.

Then, as shown in FIG. 6A, the first substrate 150 on which the layers of material 123 for anode catalyst layer have been formed may be placed such that the layers of material 123 are disposed in positions facing one surface of the electrolyte membrane 122. Also, a second substrate 152 may be placed such that layers of material 129 for cathode catalyst layer are disposed in positions facing the other surface of the electrolyte membrane 122. Here, the second substrate 152 has a plurality of layers of material 129 for cathode catalyst layer demarcated by the spacings 127, and is formed by a method similarly used when the layers of material 123 for anode catalyst layer are formed on the first substrate 150. Each spacing 125 formed on the first substrate 150 and each spacing 127 formed on the second substrate 152 may be arranged such that the spacing 125 and the spacing 127 are displaced (not aligned), in an extending direction of the electrolyte membrane 122, with a through-hole 122a interposed between the spacing 125 and the spacing 127. Then, the first substrate 150 and the second substrate 152 may be press-bonded to the electrolyte membrane 122 by a press machine. As a result, the layers of material 123 for anode catalyst layer and the layers of material 129 for cathode catalyst layer may be printed on the electrolyte membrane 122. In other embodiments, the layers of material 123 for the anode catalyst layer and the layers of materials 129 for the cathode catalyst layer may be disposed directly on the electrolyte membrane 122 using any suitable method.

Figure 6B:
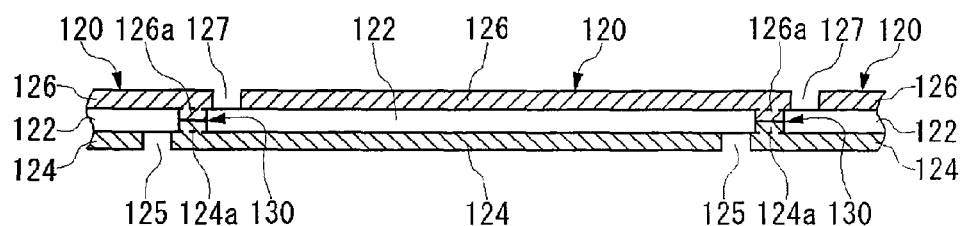

As a result, as shown in FIG. 6B, the layers of material 123 for anode catalyst layer are transferred onto one surface of the electrolyte membrane 122 so as to form anode catalyst layers 124, whereas the layers of material 129 for cathode catalyst layer are transferred onto the other surface of the electrolyte membrane 122 so as to form cathode catalyst layers 126. Also, the first substrate 150 may be press-bonded to the electrolyte membrane 122, so that a part of the layer of material 123 for anode catalyst layer is filled into the through-hole 122a from one surface side of the electrolyte membrane 122. The part of the layer of material 123, for anode catalyst layer, which has been filled into the through-hole 122a becomes a protrusion 124a formed integrally with the anode catalyst layer 124. Also, the second substrate 152 may be press-bonded to the electrolyte membrane 122, so that a part of the layer of material 129 for cathode catalyst layer is filled into the through-hole 122a from the other surface side of the electrolyte membrane 122. The part of the layer of material 129, for cathode catalyst layer, which has been filled into the through-hole 122a becomes a protrusion 126a formed integrally with the cathode catalyst layer 126. The protrusion 124a and the protrusion 126a are in contact with each other in the through-hole 122a, thereby forming an interconnector 130.

Figure 6C:
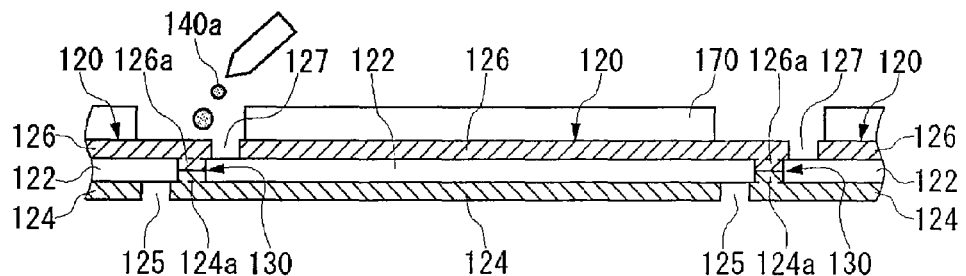

Then, as shown in FIG. 6C, mask 170 may be formed selectively on the cathode catalyst layer 126 in alignment with a pattern of seal layers 140 using a lithography method or the like. In such embodiments, a resin solution 140a containing a resin that constitutes the seal layer 140 may be filled into an opening of the mask 170 so as to infiltrate the resin solution 140a into the cathode catalyst layer 126. Similarly, mask (not shown) may be formed selectively on the anode catalyst layer 124, the resin solution 140a is filled into an opening of the mask so as to infiltrate the resin solution 140a into the anode catalyst layer 124. It should be noted that resin solution 140a may be disposed using any number of suitable methods, for example, stenciling, screen printing or ink jet printing may be used. Then the resin solution 140a may be dried and solidified. Note that the coating quantity of the resin solution 140a may be adjusted in consideration of a drop in volume due to the drying and solidification. The mask may be removed after the seal layers are disposed.

Figure 6D:
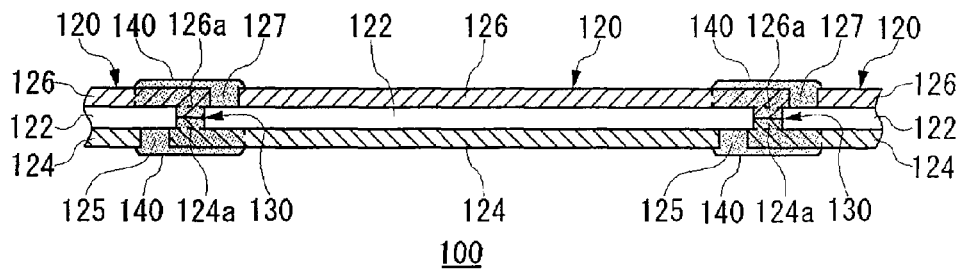

As a result, as shown in FIG. 6D, seal layers 140 are formed, which are so provided as to fill in fine pores of the interconnector 130 and fine pores of the anode catalyst layer 124 and the cathode catalyst layer 126 in the vicinity of the interconnector 130 including the top thereof. Also, the seal layers 140 may be so provided as to fill in the spacings 125 and 127. Through the processes as described above, a fuel cell layer 100 according to the first embodiment is manufactured. As a further step, provision of the anode housing 52 on an anode catalyst layer 124 side of the fuel cell layer 100 via the gasket 56 and provision of the cathode housing 50 on a cathode catalyst layer 126 side thereof via the gasket 57 enables the manufacturing of the fuel cell system 10.

As described above, the fuel cell layer 100 according to a first embodiment includes a plurality of membrane electrode assemblies 120 disposed in a planar arrangement and interconnectors 130. The interconnector 130 may be formed of at least one of a material that constitutes the anode catalyst layer 124 and a material that constitutes the cathode catalyst layer 126. As a result, the number of materials required for the manufacturing of the fuel cell layer 100 may be reduced as compared with the case where separate members such as terminal tabs need to be prepared as the interconnectors in the conventional planar fuel cells. Thus, the manufacturing cost of the fuel cell layer 100 can be reduced.

Each interconnector 130 may be structured by joining together the protrusion 124a formed integrally with the anode catalyst layer 124 and the protrusion 126a formed integrally with the cathode catalyst layer 126. As a result, the contact resistance between the interconnector 130 and each catalyst layer may be reduced. Also, the number of components used in the fuel cell layer 100 may be reduced, so that the manufacturing process of the fuel cell layer 100 may be simplified.

The electrolyte membrane 122 may have through-holes 122a, and the interconnector 130 is provided in the through-hole 122a. As a result, the strength of the electrolyte membranes 122 disposed between the adjacent membrane electrode assemblies 120 may be maintained. Also, the amount of catalyst materials required for the formation of the interconnector 130 may be suppressed and therefore the increase in manufacturing cost may be restricted.

(Modifications)

Figure 7A:
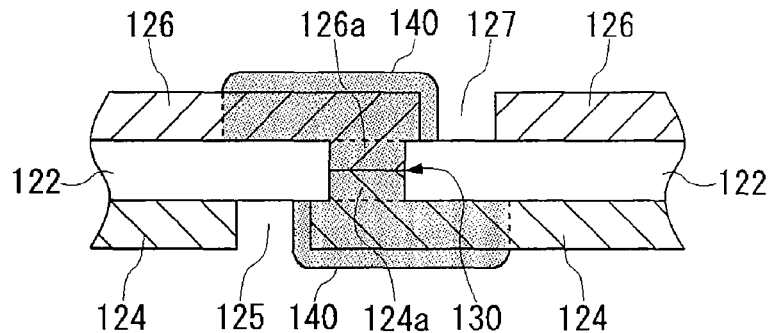
FIG. 7A is partially enlarged cross-sectional view schematically showing a vicinity of an interconnector in a fuel cell layer according to a first modification.
Figure 7B:
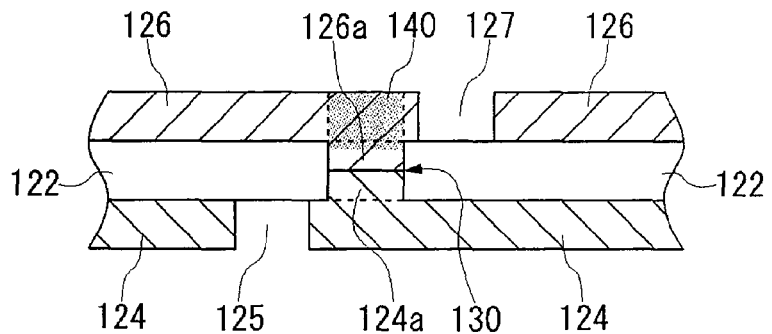
FIG. 7B is partially enlarged cross-sectional view schematically showing a vicinity of an interconnector in a fuel cell layer according to a second modification.
Figure 7C:
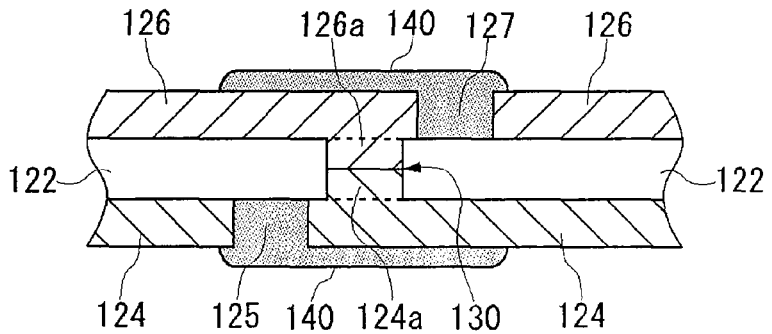
FIG. 7C is partially enlarged cross-sectional view schematically showing a vicinity of an interconnector in a fuel cell layer according to a third modification.
Figure 7D:
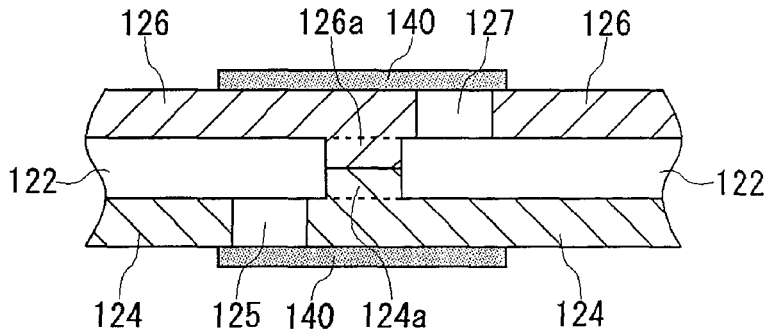
FIG. 7D is partially enlarged cross-sectional view schematically showing a vicinity of an interconnector in a fuel cell layer according to a fourth modification.

Next, a description is given hereinbelow of first to fourth modifications where the shape of the seal layer 140 may be varied in the fuel cell layer 100 according to the first embodiment. FIG. 7A is partially enlarged cross-sectional view schematically showing the vicinity of an interconnector in a fuel cell layer according to a first modification. FIG. 7B is partially enlarged cross-sectional view schematically showing the vicinity of an interconnector in a fuel cell layer according to a second modification. FIG. 7C is partially enlarged cross-sectional view schematically showing the vicinity of an interconnector in a fuel cell layer according to a third modification. FIG. 7D is partially enlarged cross-sectional view schematically showing the vicinity of an interconnector in a fuel cell layer according to a fourth modification.

(First Modification)

According to the first modification as shown in FIG. 7A, the seal layers 140 are provided so that the seal layers 140 fill in the fine pores of the interconnector 130, the fine pores of the anode catalyst layer 124 in the vicinity of the interconnector 130 including the top thereof and the fine pores of the cathode catalyst layer 126 in the vicinity of the interconnector 130 including the top thereof. Also, the seal layers 140 are so provided as to cover the side wall facing the spacing 125 between the adjacent anode catalyst layers 124 and the side wall facing the spacing 127 between the adjacent cathode catalyst layers 126.

Covering the side walls in the spacings 125 and 127 by the seal layer 140 may prevent shorts between the adjacent catalyst layers. Accordingly, as compared with the case where the spacings 125 and 127 are filled in completely, the amount of materials required for the formation of the seal layers 140 can be reduced while potential for shorts between the adjacent catalyst layers may still be prevented.

(Second Modification)

According to the second modification as shown in FIG. 7B, a seal layer 140 may be provided in the cathode catalyst layer 126, disposed adjacent to an end of the interconnector 130, in such a manner as to cover the end of the interconnector 130 on a cathode catalyst layer 126 side. For example, this seal layer 140 may be formed such that the resin solution 140a is infiltrated from the cathode catalyst layer 126 side. How the seal layer 140 is provided is not limited to the case of the present modification where the seal layer 140 is so provided as to fill in the fine pores of cathode catalyst layer 126 disposed adjacent to the end of the interconnector 130. The occurrence of cross leaks can be prevented as long as the seal layer 140 is so provided as to fill in at least one of a part of the fine pores inside the interconnector 130 and the fine pores of the anode catalyst layer 124 disposed adjacent to the other end of the interconnector 130. In other words, it suffices if the seal layer 140 is so provided as to block the passage allowing the flow of fuel or oxidant.

(Third Modification)

According to the third modification as shown in FIG. 7C, the seal layers 140 are formed in the surfaces of the anode catalyst layer 124 and the cathode catalyst layer 126 without the seal layers 140 infiltrated into the anode catalyst layer 124, the interconnector 130 and the cathode catalyst layer 126. In this case, the occurrence of cross leaks can be prevented while the electric conductivity in the vicinity of the interconnector 130 is preserved. The seal layer 140 according to the present modification can be formed by increasing the viscosity of the resin solution 140a.

(Fourth Modification)

According to the fourth modification as shown in FIG. 7D, the seal layers 40 are formed of a sheet-like seal material and are provided in the surfaces of the anode catalyst layer 124 on the interconnector 130 and the cathode catalyst layer 126 on the interconnector 130. In this case, too, the occurrence of cross leaks can be suppressed. The seal layers 140 are so provided as to further cover the spacings 125 and 127. This structure prevents the water generated at the power generation from entering the spacings 125 and 127 and prevents the shorts between the adjacent catalyst layers.

If, as with the third modification and the fourth modification, the seal layers 140 are not formed in the interconnector 130 or the catalyst layers but formed in the surface of a catalyst layer or catalyst layers, it is only necessary that the seal layers 140 should be so provided as to cover a region of at least one of the surface of the anode catalyst layer 124 and the surface of the cathode catalyst layer 126 that overlaps with the interconnector 130 as viewed planarly.

(Second Embodiment)

In the manufacturing method of a fuel cell layer 100 according to a second embodiment of the present invention, the shape of the first substrate 150 and the second substrate 152 used to fabricate the fuel cell layer 100 may differ from that used in the first embodiment. Note that the final structures of the fuel cell system 10 and the fuel cell layer 100 and the manufacturing process thereof are basically the same as those described in the first embodiment. The same structural components as those of the first embodiment are given the identical reference numerals and the description thereof is omitted as appropriate.

FIGS. 8A to 8E are cross-sectional views showing a process in a method for manufacturing a fuel cell layer according to the second embodiment.

Figure 8A:
FIGS. 8A to 8E are cross-sectional views showing a process in a method for manufacturing a fuel cell layer according to a second embodiment of the present invention.
Figure 8B:
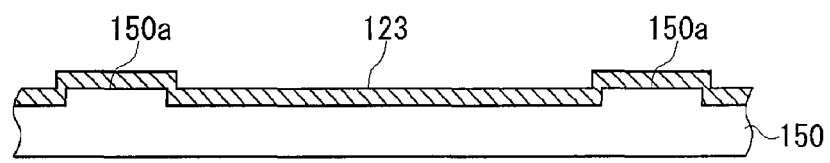

As shown in FIG. 8A, a first substrate 150 having a projected portion 150a on the surface thereof is used in the second embodiment. The position in which the projected portion 150a is provided may be disposed opposite to the through-hole 122a when the first substrate 150 is press-bonded to the electrolyte membrane 122. A material 123a for anode catalyst layer may be applied to the surface of the first substrate 150 where the projected portion 150a is provided, using a spray coating method, for instance. As a result, as shown in FIG. 8B, a layer of material 123 for anode catalyst layer may be formed on the whole surface of the first substrate 150. As a result, the portions, of the layer of material 123 for anode catalyst layer, provided on the projected portion 150a may be projected higher than the other portions thereof.

Figure 8C:
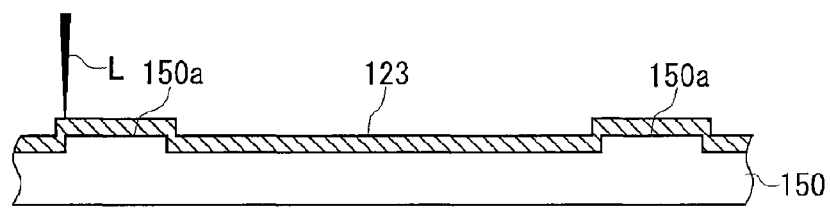
Figure 8D:
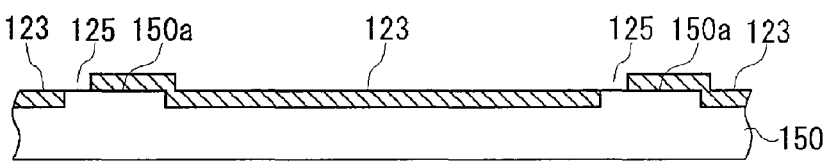

Then, as shown in FIG. 8C, a laser light L, for instance, is irradiated onto preparation regions of the anode catalyst layer 124 where the spacings 125 are to be formed, thereby removing selectively the layer of material 123 for anode catalyst layer. This process results in the formation of a plurality of layers of material 123 for anode catalyst layer demarcated by the spacings 125 on the surface of the first substrate 150.

Figure 8E:
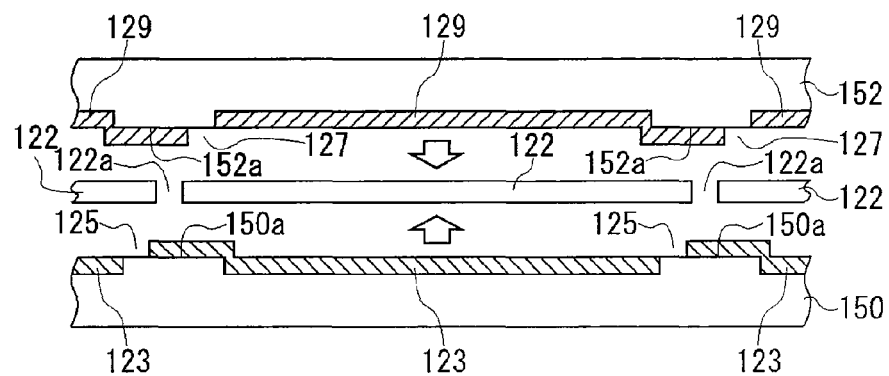

Then, as shown in FIG. 8E, the first substrate 150 on which the layers of material 123 for anode catalyst layer have been formed is placed such that the layer of material 123 are disposed in positions facing one surface of the electrolyte membrane 122. Also, a second substrate 152, having projected portions 152a, on which the layers of material 129 for cathode catalyst layer have been formed similarly to the layers of material 123 for anode catalyst layer is placed such that the layers of material 129 for cathode catalyst layer may be disposed in positions facing the other surface of the electrolyte membrane 122. Then, the first substrate 150 and the second substrate 152 may be press-bonded to the electrolyte membrane 122 by a press machine. As a result, the layers of material 123 for anode catalyst layer and the layers of material 129 for cathode catalyst layer may be printed on the electrolyte membrane 122. A fuel cell layer 100 is hereinafter formed using the similar method employed in the first embodiment.

According to the second embodiment as described above, the catalyst layers may be press-bonded to the electrolyte membrane 122 by the use of a substrate having projected portions in the positions corresponding to the through-holes 122a. Accordingly, part of catalyst layers can enter within the through-hole 122a more reliably. As a result, the interconnector 130 can be tightly formed in the through-hole 122a without no space therebetween. That is, the cross-sectional area of the interconnector 130 can be maximized. Also, the pressure bonding of the protrusion 124a, entering within the through-hole 122a, with the protrusion 126a may be assured. Thus, the adjacent membrane electrode assemblies 120 can be electrically connected more reliably. It may be acceptable that at least one of the substrate 150 and the second substrate 152 has the projected portion. However, if both the substrate 150 and the second substrate 152 have the projected portions, the adjacent membrane electrode assemblies 120 can be electrically connected more reliably.

(Modifications)

Figure 9A:
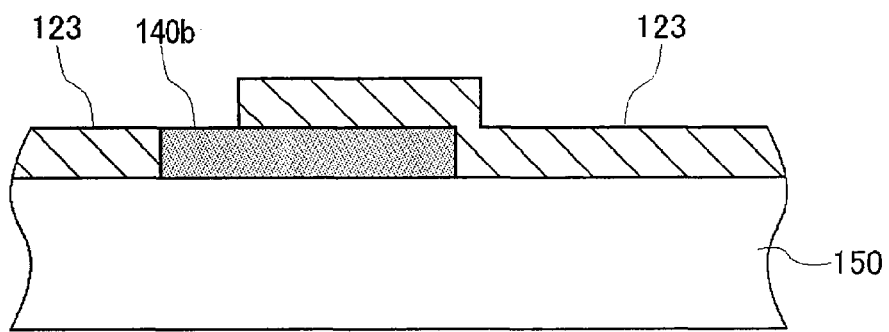
FIG. 9A is partially enlarged cross-sectional view schematically showing a first substrate in a method for fabricating the fuel cell layer according to a fifth modification.
Figure 9B:
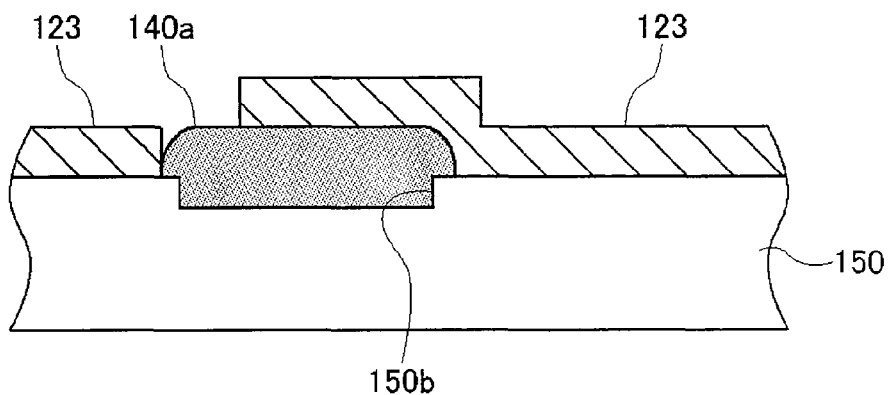
FIG. 9B is partially enlarged cross-sectional view schematically showing a first substrate in a method for fabricating the fuel cell layer according to a sixth modification.

The following fifth and sixth modifications are modifications to the second embodiment showing still another shapes of the first substrate 150 and the second substrate 152. FIG. 9A is partially exploded cross-sectional view schematically showing a first substrate in a method for fabricating the fuel cell layer according to the fifth modification. FIG. 9B is partially exploded cross-sectional view schematically showing a first substrate in a method for fabricating the fuel cell layer according to the sixth modification. Note that FIGS. 9A and 9B illustrates only a part of a method for fabricating the fuel cell layer 100.

(Fifth Modification)

According to the fifth modification as shown in FIG. 9A, a projected portion is formed in the surface of the first substrate 150 by placing a sheet-like seal layer forming material 140b in the surface of the first substrate 150. In such a case, when the first substrate 150 is press-bonded to the electrolyte membrane 122 (See FIG. 6A), the seal layer 140 can be formed simultaneously with the formation of the anode catalyst layer 124 and the protrusion 124a (See FIGS. 6B-6D). As a result, the number of manufacturing processes for the fuel cell layer 100 (See FIG. 6D) may be reduced. Note that the shape of the second substrate 152 (See FIG. 6A) may be similar to that of the first substrate 150.

(Sixth Modification)

According to the fifth modification as shown in FIG. 9B, a recessed portion 150b is formed in the surface of the first substrate 150, and the resin solution 140a which is a seal layer forming material is filled into the recessed portion 150b, thereby forming a projected portion in the first substrate 150. In this case, too, similarly to the fifth modification, the seal layer 140 can be formed simultaneously with the formation of the anode catalyst layer 124 and the protrusion 124a (See FIGS. 6B-6D). As a result, the number of manufacturing processes for the fuel cell layer 100 (See FIG. 6D) may be reduced. Note that the shape of the second substrate 152 (See FIG. 6A) may be similar to that of the first substrate 150. In some embodiments, the resin solution 140a may have a certain high viscosity.

(Third Embodiment)

The manufacturing method of a fuel cell layer 100 according to a third embodiment of the present invention differs from the manufacturing process in the first embodiment. A description is hereinbelow given of the third embodiment. Note that the structures of the fuel cell system 10 and the fuel cell layer 100 may basically be the same as those described in the first embodiment. The same structural components as those of the first embodiment are given the identical reference numerals and the description thereof is omitted as appropriate.

FIGS. 10A to 10D are cross-sectional views showing a process in a method for manufacturing a fuel cell layer according to the third embodiment.

Figure 10A:
FIGS. 10A to 10D are cross-sectional views showing a process in a method for manufacturing a fuel cell layer according to a third embodiment of the present invention.
Figure 10B:
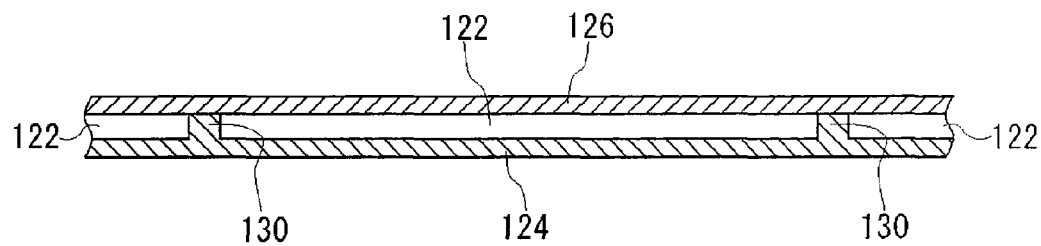

As shown in FIG. 10A, a material 123a for anode catalyst layer may be applied to one surface of the electrolyte membrane 122 where the through-holes 122a are formed, using a spray coating method, for instance. Similarly, the material for cathode catalyst layer may be applied to the other surface of the electrolyte membrane 122. Thus, as shown in FIG. 10B, the anode catalyst layer 124 may be formed on the whole surface of one surface of the electrolyte membrane 122, and the cathode catalyst layer 126 is formed on the whole surface of the other surface thereof. Since, in the third embodiment, the material 123a for anode catalyst layer may be applied before the material for cathode catalyst layer may be applied, only the material 123a for anode catalyst layer is filled into the through-hole 122a so as to form the interconnector 130.

Figure 10C:
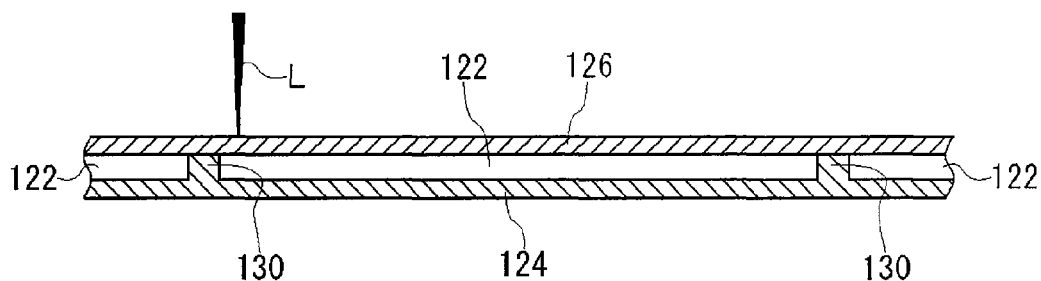
Figure 10D:
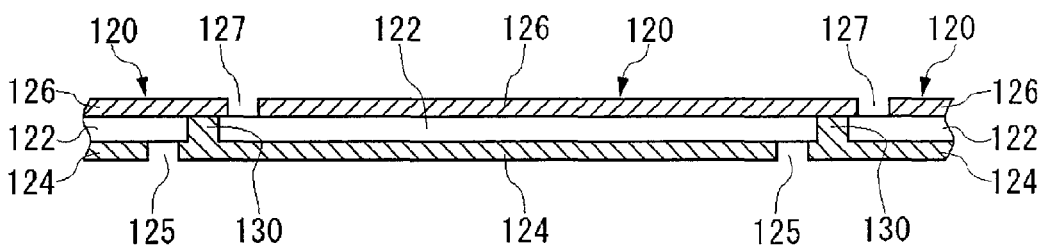

Then, as shown in FIG. 10C, the cathode catalyst layer 126 may be irradiated with a laser light L, for instance, in predetermined positions, thereby removing selectively the cathode catalyst layer 126. Similarly, the anode catalyst layer 124 may be selectively removed. As shown in FIG. 10D, this process results in the formation of a plurality of anode catalyst layers 124 demarcated by the spacings 125 on one surface of the electrolyte membrane 122. The process also results in the formation of a plurality of cathode catalyst layers 126 demarcated by the spacings 127 on the other surface of the electrolyte membrane 122. As a result, a plurality of membrane electrode assemblies 120 disposed in a planar arrangement are formed. A fuel cell layer 100 may hereinafter be formed using the similar method employed in the first embodiment.

The fuel cell layer 100 formed by employing the manufacturing method according to the present embodiment achieves the same advantageous effects as those of the first embodiment. Though, in the present embodiment, forming the spacings 125 and 127 is comparatively harder than forming the spacings 125 and 127 in the layers of materials for catalyst layers formed on the substrates, the manufacturing process of the fuel cell layer 100 can be simplified because the number of apparatuses required for the fabrication can be reduced. Also, since the catalyst layers are not press-bonded to the electrolyte membrane 122 by the press machine, the risk of causing damage to the electrolyte membrane 122 can be significantly reduced.

The present invention is not limited to the above-described embodiments and modifications only, and it is understood by those skilled in the art that various modifications such as changes in design may be further made based on their knowledge and the embodiments added with such modifications are also within the scope of the present invention.

For example, in the above-described first and second embodiments, the anode catalyst layer 124 and the cathode catalyst layer 126 may be simultaneously press-bonded to the electrolyte membrane 122 so as to form the interconnector 130 by the protrusion 124a and the protrusion 126a. Instead, the interconnector 130 may be formed as follows. That is, the anode catalyst layer 124 is, for example, first press-bonded to the electrolyte membrane 122, and a material that constitutes the anode catalyst layer 124 is filled into the through-hole 122a. Then the cathode catalyst layer 126 is press-bonded to the electrolyte membrane 122. As a result, the interconnector 130 composed of the protrusion 124a alone is formed integrally with the anode catalyst layer 124. Similarly, an interconnector 130 composed of the protrusion 126a alone may be formed integrally with the cathode catalyst layer 126.

Also, a current collector (not shown) may be each provided in the anode catalyst layer 124 and the cathode catalyst layer 126.

In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37, C.F.R. §1.72 (b), to allow the reader to quickly ascertain the nature of the technical disclosure. It is submitted with the understanding that it will not be used to interpret or limit the scope or meaning of the claims.

What is claimed is:

1. A fuel cell layer, comprising:
a plurality of membrane electrode assemblies, disposed in a planar arrangement, each membrane electrode assembly including an electrolyte membrane, an anode catalyst layer provided on one face of the electrolyte member and a cathode catalyst layer provided on the other face of the electrolyte membrane in such a manner that at least part of which is disposed counter to the anode catalyst layer;
an interconnector which electrically connects the anode catalyst layer of an adjacent one of the membrane electrode assemblies to the cathode catalyst layer of another adjacent one of the membrane electrode assemblies;
a first seal layer adjacent at least part of a cathode-side of the interconnect, the first seal layer contacting one face of the electrolyte membrane and disposed on only a single side of a plane of the other face of the electrolyte membrane, the first seal layer for blocking the transfer of fuel and oxidant from one catalyst layer to the other catalyst layer by way of said interconnector; and
a second seal layer adjacent at least part of an anode-side of the interconnect, the second seal layer contacting one face of the electrolyte membrane and disposed on only a single side of a plane of the other face of the electrolyte membrane, the second seal layer for blocking the transfer of fuel and oxidant from one catalyst layer to the other catalyst layer by way of said interconnector;

wherein the interconnector is integrally formed with the anode catalyst layer and formed of at least one material that constitutes the anode catalyst layer, the interconnector is integrally formed with the cathode catalyst layer and formed of at least one material that constitutes the cathode catalyst layer, or a combination thereof.

2. A fuel cell layer according to claim 1, wherein said plurality of membrane electrode assemblies are disposed in a planar arrangement such that the respective anode catalyst layers in each membrane electrode assembly are spaced apart from each other on the one face of the electrolyte member and the respective cathode catalyst layers in each membrane electrode assembly are spaced apart from each other on the other face thereof, wherein the electrolyte membrane has a through-hole running from the one face thereof to the other face thereof, and wherein said interconnector is provided in the through-hole.

3. A fuel cell layer according to claim 1, wherein the anode catalyst layer in the one of the adjacent membrane electrode assemblies and the cathode catalyst layer in the other of the adjacent membrane electrode assemblies overlap partially with each other as viewed planarly, and wherein said interconnector is provided in a region where the anode catalyst layer in the adjacent membrane electrode assemblies and the cathode catalyst layer in the other thereof overlap with each other.

4. A fuel cell layer according to claim 1, wherein said first or second seal layer is provided in such a manner that at least one of fine pores of a material that constitutes said interconnector, fine pores of the anode catalyst layer adjacent to one end of said interconnector and fine pores of the cathode catalyst layer adjacent to the other end of said interconnector is filled by said first or second seal layer.

5. A fuel cell layer according to claim 1, wherein said first or second seal layer is provided in such a manner as to cover a face of at least one of the anode catalyst layer and the cathode catalyst layer in a region where the face of the at least one of the anode catalyst layer and the cathode catalyst layer overlaps with said interconnector as viewed planarly.

6. A fuel cell layer according to claim 4, wherein said seal layer is provided in such a manner as to cover a side wall of the catalyst layer facing a spacing between adjacent catalyst layers.

7. A fuel cell layer according to claim 4, wherein said seal layer is provided in such a manner as to fill a space between adjacent catalyst layers.

8. A fuel cell system comprising:
fuel cell layer according to claim 1;
a cathode housing disposed adjacent the cathode catalyst layers; and,
an anode housing disposed adjacent the anode catalyst layers.

9. A method for fabricating a fuel cell layer, the method including:
forming a plurality of membrane electrode assemblies disposed in a planar arrangement in such a manner that forming a plurality of anode catalyst layers on one face of an electrolyte membrane and forming a plurality of cathode catalyst layers on the other face of the electrolyte membrane are carried out simultaneously or in random order; and forming an interconnector configured to electrically connect the anode catalyst layer in one of adjacent membrane electrode assemblies and the cathode catalyst layer in the other of adjacent membrane electrode assemblies to each other in such a manner that a material for use as the anode catalyst layer is filled into a spacing, used to separate the electrolyte membrane of the adjacent membrane electrode assemblies partially or completely, by forming the anode catalyst layer or a material for use as the cathode catalyst layer is filled into the spacing by forming the cathode catalyst layer, or forming the interconnector in such a manner that the material for use as the anode catalyst layer is filled into the spacing by forming the anode catalyst layer and the material for use as the catalyst layer is filled into the spacing by forming the cathode catalyst layer;

forming a first seal layer adjacent at least part of a cathode-side of the first seal layer contacting one face of the electrolyte membrane and disposed on only a single side of a plane of the other face of the electrolyte membrane, the first seal layer for blocking the transfer of fuel and oxidant from one catalyst layer to the other catalyst layer by way of said interconnector; and forming a second seal layer adjacent at least part of an anode-side of the interconnect, the second seal layer contacting one face of the electrolyte membrane and disposed on only a single side of a plane of the other face of the electrolyte membrane, the second seal layer for blocking the transfer of fuel and oxidant from one catalyst layer to the other catalyst layer by way of said interconnector;

wherein the interconnector is integrally formed with at least one of the cathode layer or anode layer.

10. A method, for fabricating a fuel cell layer, according to claim 9, wherein a first substrate on which the material for use as the anode catalyst layer is stacked is disposed in a position facing one face of the electrolyte membrane, wherein a second substrate on which the material for use as the cathode catalyst layer is stacked is disposed in a position facing the other face of the electrolyte membrane, and wherein the anode catalyst layer is formed on the one face of the electrolyte membrane and the cathode catalyst layer is formed on the other face thereof by press-bonding the first substrate and the second substrate to the electrolyte membrane, and the interconnector is formed by filling at least one of the material for use as the anode catalyst layer and the material for use as the cathode catalyst layer into the spacing through the press-bonding.

11. A method, for manufacturing a fuel cell layer, according to claim 10, wherein at least one of the first substrate and the second substrate has a projected portion in a surface region corresponding to the spacing.

12. A method, for manufacturing a fuel cell layer, according to claim 11, wherein the projected portion is formed by stacking a seal layer forming material on a surface of the substrate.

* * * * *